(12) United States Patent
Brown

(10) Patent No.: US 8,833,689 B1
(45) Date of Patent: Sep. 16, 2014

(54) MOTORIZED APPARATUS FOR A FISHING ROD AND REEL

(71) Applicant: Jerry H. Brown, Joplin, MO (US)

(72) Inventor: Jerry H. Brown, Joplin, MO (US)

( * ) Notice: Subject to any disclaimer, the term of this patent is extended or adjusted under 35 U.S.C. 154(b) by 0 days.

(21) Appl. No.: 14/082,170

(22) Filed: Nov. 17, 2013

(51) Int. Cl.
*A01K 89/01* (2006.01)
*A01K 89/017* (2006.01)
*A01K 87/00* (2006.01)

(52) U.S. Cl.
CPC ............ *A01K 87/007* (2013.01); *A01K 89/017* (2013.01)
USPC ............................. 242/250; 242/225; 242/323

(58) Field of Classification Search
CPC ........................... A01K 89/012; A01K 89/017
USPC .................................. 242/250, 252, 225, 323
See application file for complete search history.

(56) References Cited

U.S. PATENT DOCUMENTS

| | | | |
|---|---|---|---|
| 2,262,637 A * | 11/1941 | Fanshier | 43/21 |
| 2,541,876 A | 2/1951 | Lockwood | |
| 2,709,867 A | 6/1955 | Routh | |
| 3,195,830 A * | 7/1965 | Balaguer | 242/225 |
| 3,220,667 A | 11/1965 | Madsen | |
| 3,252,239 A | 5/1966 | Moeller | |
| 3,459,387 A | 8/1969 | Miyamae | |
| 4,283,025 A | 8/1981 | Whisenhunt | |
| 4,515,324 A * | 5/1985 | Barton | 242/250 |
| 4,517,760 A | 5/1985 | Randle | |
| 4,932,602 A * | 6/1990 | Scott | 242/394.1 |
| 6,126,104 A * | 10/2000 | Kellerman | 242/225 |
| 6,685,125 B1 * | 2/2004 | Tucci | 242/390.8 |
| 7,073,740 B2 | 7/2006 | Westhoff | |
| 2011/0209383 A1 * | 9/2011 | Tennyson | 43/21 |
| 2012/0280074 A1 | 11/2012 | Badur et al. | |

* cited by examiner

*Primary Examiner* — Emmanuel M Marcelo
(74) *Attorney, Agent, or Firm* — William R. Sharp

(57) ABSTRACT

An apparatus for use with a fishing rod and reel is provided, which allows ease of use by a person who has the ability to effectively use only one arm and/or hand. The reel has a reel foot and crankshaft, and the rod has a rod seat. The apparatus includes a mounting body having a mounting body foot securely but removably receivable by the rod seat, and also having a mounting body seat in which the reel foot is securely but removably receivable. The apparatus further comprises an electric motor having a drive shaft, a motor mounting means for fixedly but removably mounting the motor to the mounting body, and a linkage mechanism for mechanically linking the drive shaft of the motor to the crankshaft of the reel.

10 Claims, 2 Drawing Sheets

MOTORIZED APPARATUS FOR A FISHING ROD AND REEL

BACKGROUND OF THE INVENTION

The invention relates to an apparatus for use with a fishing rod and reel which allows ease of use by a person who has the ability to effectively use only one arm and/or hand.

Such an unfortunate condition can result from serious injury, amputation, stroke, nerve damage, etc. Conventional fishing equipment requires the use of one arm and hand to hold the rod, and the other arm and hand to operate the crank of the reel. Specially designed and built electric reels are available that do not require cranking by hand. However, these types of reels are quite heavy and very expensive. Attempts to use conventional equipment have proven to be impractical because of modifications to the reel that are required.

SUMMARY OF THE INVENTION

It is, therefore, an object of the invention to provide an apparatus for use with a conventional rod and reel that is useable by a person who is physically challenged in the manner discussed above, and which requires no structural modifications to the reel.

The above object is realized by an apparatus for use with a fishing rod having a rod seat and a reel having a reel foot and crankshaft, wherein the apparatus comprises: a mounting body having a mounting body foot securely but removably receivable by the rod seat, and also having a mounting body seat in which the reel foot is securely but removably receivable; an electric motor having a drive shaft; a motor mounting means for fixedly but removably mounting the motor to the mounting body; and a linkage means for mechanically linking the drive shaft of the motor to the crankshaft of the reel.

The mounting body of the invention permits removable attachment of a conventional reel to a rod, while also allowing an electric motor to be removably mounted thereto. No structural modifications to the reel, such as to internal mechanisms and/or to an exterior housing, are required to make it compatible for use with the motor. A conventional reel has a hand crank that is simply removed from the crankshaft, and replaced by a mechanical linkage to the drive shaft of the motor as described above.

According to a preferred embodiment of the invention, an electrical current is supplied to the electric motor by a battery through a normally open pushbutton switch that has been closed. Accordingly, the crankshaft is rotated so as to rewind fishing line that was previously cast out into a body of water. The fishing rod can be held with the fingers of one hand and the pushbutton switch actuated with the thumb of the same hand, thus allowing a fisherman having the effective use of only one arm and/or hand to fish with ease.

It is particularly preferred to further provide a normally closed safety switch, as connected in series with the battery and pushbutton switch, which is opened to thereby terminate operation of the motor in response to a predetermined pull upon the fishing line. This feature prevents overburdening of, and possible damage to, the motor. Consequently, a relatively small motor can be employed since the fisherman does not rely upon the power of the motor to pull in a fish, but instead lifts the rod up and back so as to exert an inward pulling force upon the fish. Even if the fisherman continues to press upon and thus close the pushbutton switch, the safety switch will open in response to a predetermined pull upon the line and consequently turn the motor off. After the fisherman has at least partially pulled in the fish in the manner described above, the motor will resume its operation and rewind line upon the reel as long as the pushbutton switch remains closed while the rod is lowered so as to minimize tension upon the line and thereby return the safety switch to its closed position. This procedure is repeated as many times as necessary until the fish is pulled into the fisherman as positioned on a boat or bank.

DETAILED DESCRIPTION OF THE INVENTION

Figure 1:
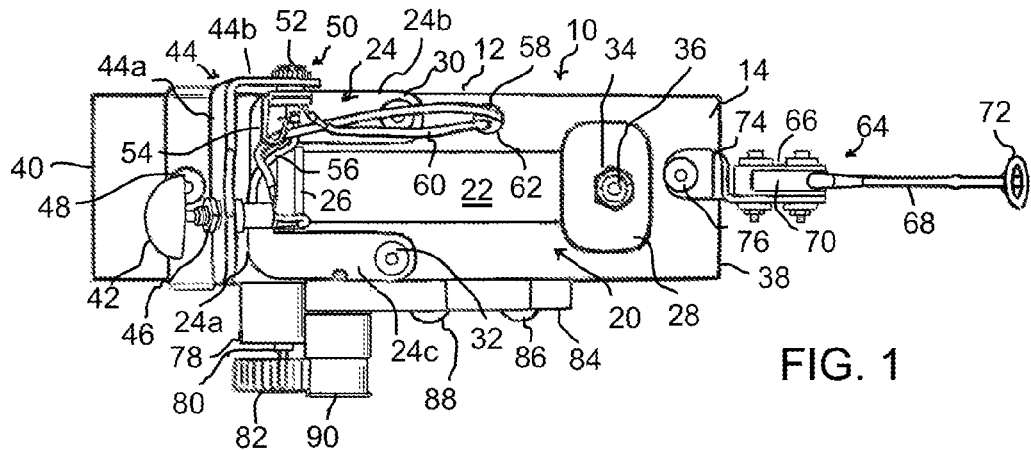
FIGS. 1-3 are respective top and opposing side views of a mounting body and associated motor and switches for control thereof in accordance with one embodiment of the invention.

Referring to FIG. 1, mounting body 10 includes an elongated portion 12 having upper and lower sides, of which only upper side 14 is shown in this FIGURE. The terms "upper" and "lower" are used herein in describing the invention as generally oriented when in use. A mounting body seat, generally indicated at 20, is incorporated into upper side 14 so as to comprise a recessed area 22, a U-shaped member 24 having a fixed holding flange 26 at one end of recessed area 22, and an adjustable holding plate 28 at the other end of recessed area 22. Fixed holding flange 26 extends from and is integral with transversely extending portion 24a of U-shaped member 24. U-shaped member 24 also has opposing longitudinally extending portions 24b and 24c respectively affixed to elongated portion 12 with bolts 30 and 32, of which the heads are visible in FIG. 1. With respect to adjustable holding plate 28, a nut 34 is threadedly received over the shaft of bolt 36, and may be turned in either rotational direction to allow adjustment of the maximum perpendicular distance between holding plate 28 and the upper side 14 of elongated portion 12, as will become more clear in subsequent FIGURES.

Elongated portion 12 of the mounting body further has a front end 38 and back end 40. A pushbutton switch 42 is fixedly mounted on the upper side 14 of elongated portion 12 adjacent to its back end 40. More specifically, pushbutton switch 42 is mounted to elongated portion 12 by means of a bracket 44 having a transversely extending portion 44a, which has an opening through which the body of pushbutton switch 42 is received and secured with a nut 46. Bracket 44 further has a flange integral with transversely extending portion 44a and secured to elongated portion 12 with a bolt 48. In addition, a phone jack 50 is secured to a longitudinally extending portion 44b of bracket 44. Phone jack 50 has a sleeve contact 52 in the form of a female socket, and a tip contact 54 as is conventional. As shown, a terminal corresponding to tip contact 54 is connected through conducting line (i.e. wire) 56 to one terminal of pushbutton switch 42. The other terminal of pushbutton switch 42 is connected to one end of conducting line 58, and the terminal of jack 50 that corresponds to sleeve contact 52 is connected to one end of conducting line 60. Conducting lines 58 and 60 extend to and through opening 62 so as to extend to their other ends for connection to terminals of other components of the illustrated apparatus in a manner described below with reference to another FIGURE.

A safety switch, generally indicated at 64, is fixedly mounted on the upper side 14 of elongated portion 12 adjacent to its front end 38. Safety switch 64 comprises a lever actuated switch 66 and an extension 68 of its lever 70. Extension 68 has one end fixedly connected to lever 70 by any suitable means, such as solder. An eyelet 72 is provided at the other end of extension 68. Lever actuated switch 66 is of the type often referred to as a micro switch. Many micro switches are commercially available that would be suitable for use as lever actuated switch 66. One particular example, which should not be construed to limit the invention in any manner, is from the SM1 series of micro switches manufactured by Zippy Technology Corp. This particular example is a model rated at 5A, which also has a "heavier" OF Max. of 107 gf. The term "OF Max." refers to the force applied to lever 70 that is required to actuate internal switch contacts. A "heavier" or high value for OF Max. (i.e. greater than about 75 gf) is preferred insofar as it assists in ensuring that lever actuated switch 66 is not excessively sensitive so as to interfere with successful and consistent operation of the apparatus, as will become more apparent in subsequent description thereof. In the illustrated embodiment, lever actuated switch 66 is secured to the upper side 14 of elongated portion 12 by means of a flanged support 74. Flanged support 74 has an outer flange fastened to lever actuated switch 66 with bolts received through mounting holes (not shown) in switch 66, and further has an inner flange mounted to upper side 14 with bolt 76.

Mounting body 10 further has an electric motor 78 mounted thereto in a manner discussed further below. As shown, electric motor 78 has a drive shaft 80. A gear 82 is fixedly mounted to drive shaft 80 in any suitable manner. Electric motor 78 is preferably a DC motor sufficiently small in size for ease of use with mounting body 10. It is also desirable that the motor draws minimal current so as to make it useable with a highly portable battery as the power supply. One particular example of a commercially available and highly suitable motor, which should not be construed to limit the invention in any manner, is a 16GA 12V 300 RPM geared motor manufactured by Shenzhen zhiqiangjin Motor Co., LTD. The designation "16GA" simply means that the motor is about 16 mm in diameter. The motor, including the gearbox, is about 40 mm long. It also draws only about 80 mA current with no load. Of course, many commercially available motors could be used with the invention, as long as the particular motor selected is mountable in the mounting body 10 as subsequently described, and is useable with a portable battery that will last for at least several hours in continuous use in the manner described herein.

Finally with respect to FIG. 1, an idler pulley arm 84 is secured to an edge of elongated portion 12 with bolts 86 and 88. An idler pulley 90 is rotatably mounted upon one end of arm 84. As shown, idler pulley 90 is axially offset from gear 82 in a direction generally toward the front end 38 of elongated portion 12.

Figure 2:
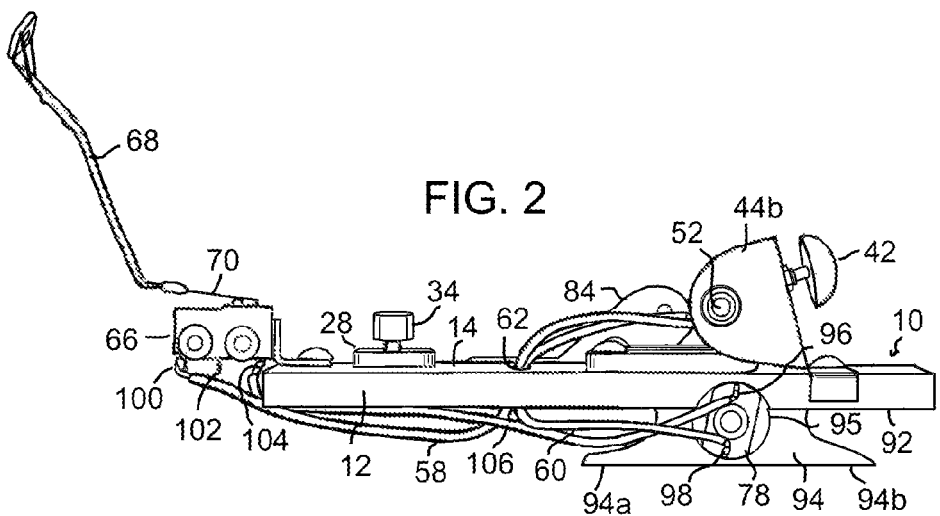

Referring now to FIG. 2, this side view of mounting body 10 and various associated elements, shows not only the upper side 14 of elongated portion 12, but also a longitudinally extending edge of lower side 92. A mounting body foot 94 is illustrated as being integrally connected to and depending from lower side 92 so as to downwardly extend to lower projecting portions 94a and 94b. With respect to one member being "integrally connected" to another member, this means that such members are fixedly connected to or integral with one another. FIG. 2 also more clearly illustrates the manner in which electric motor 78 is mounted to mounting body 10. Mounting body 10 has an opening 95, transversely extending completely therethrough, for receiving motor 78. Opening 95 extends through both elongated portion 12 and mounting body foot 94 adjacent to where they connect to one another. Although not shown in the drawings, motor 78 is preferably secured in position by a set screw. One end of electric motor 78, that is not visible in the view of FIG. 1, is shown in FIG. 2 as having the motor's terminals 96 and 98 extending therefrom. FIG. 2 further shows lever actuated switch 66 and its terminals 100, 102, and 104, as will be discussed further below with reference to the circuit's schematic diagram. Terminal 104 of lever actuated switch 66 is connected through conducting line 106 to terminal 96 of electric motor 78. Conducting lines 58 and 60 extend outwardly from opening 62, and below elongated portion 12, to their above-mentioned "other ends" (referenced in the description of FIG. 1), which are respectively connected to terminal 100 of lever actuated switch 66 and terminal 98 of electric motor 78. Other elements associated with mounting body 10, and previously discussed with reference to FIG. 1, are indicated in FIG. 2 with their corresponding reference numbers but require no further description.

Figure 3:
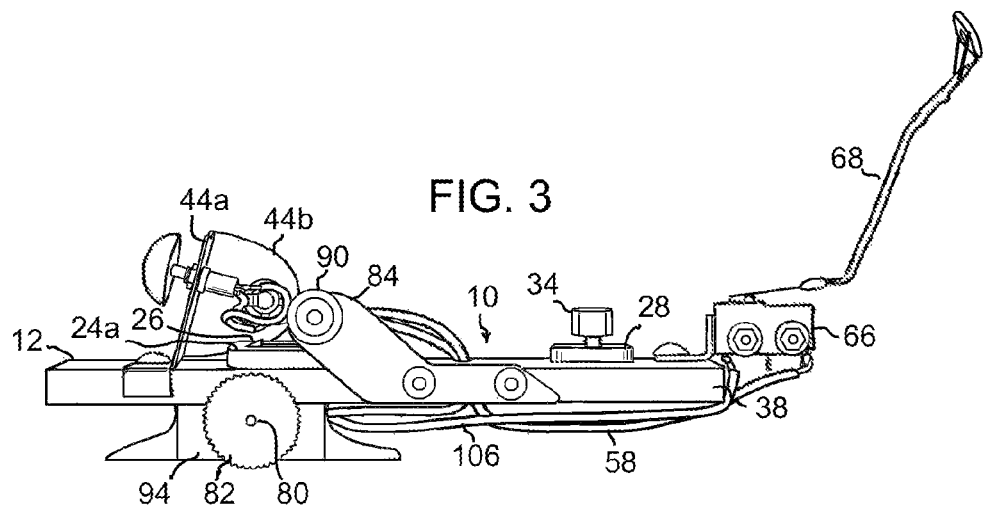

Referring now to FIG. 3, this side view of mounting body 10 and associated elements, opposite to that of the side view of FIG. 2, more clearly shows the relative positions of gear 82 and idler pulley 90. As noted previously, idler pulley 90 is axially offset from gear 82 in a direction toward front end 38 of elongated portion 12. FIG. 3 further shows the entire diameters of gear 82 and idler pulley 90. Gear 82, as fixedly mounted to drive shaft 80, obscures the motor in this view. Only the end of drive shaft 80 is visible. It should be further noted that fixed holding flange 26 extends from transversely extending portion 24a of U-shaped member 24 at an acute angle with respect thereto. As with FIG. 2, other elements associated with mounting body 10 are indicated with their corresponding reference numbers but require no further description.

Figure 4:
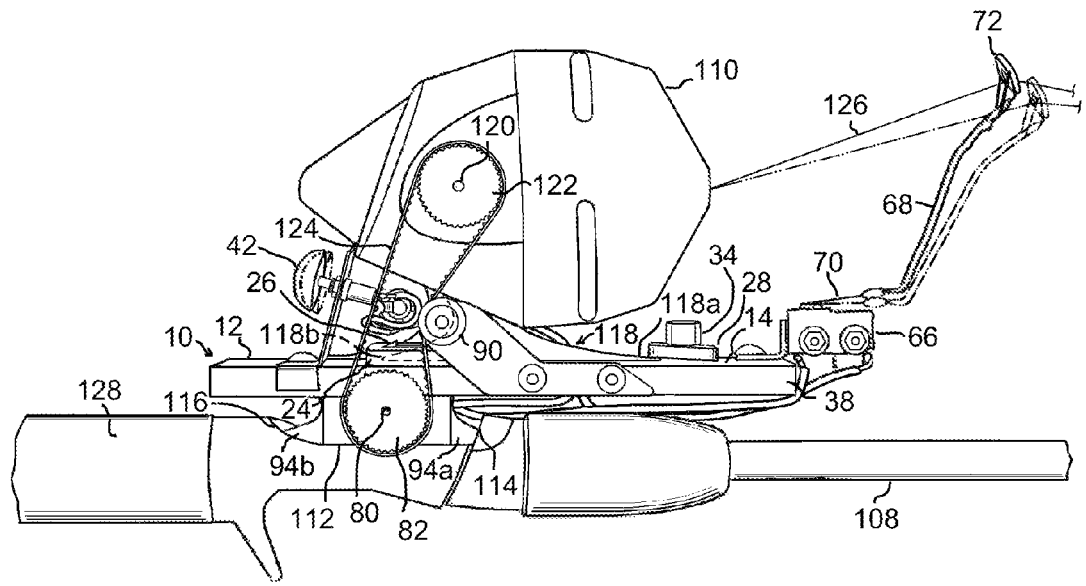
FIG. 4 is a side view showing the mounting body as it is shown in FIG. 3, with the addition of a rod and reel secured thereto for use in fishing.

Referring to FIG. 4, mounting body 10 is shown in conjunction with a rod 108 and reel 110 for use in fishing. Rod 108 has a rod seat 112 which includes foot receptacles 114 and 116, in which lower projecting portions 94a and 94b of mounting body foot 94 are securely but removably received, respectively. Reel 110 has a reel foot 118 having lower projecting portions 118a and 118b. The bottom of reel foot 118 is received in the above-mentioned recessed area (not shown in FIG. 4) on the upper side 14 of elongated portion 12. Lower projecting portion 118a is at least partially received under adjustable holding plate 28, as held firmly against lower projecting portion 118a by appropriately tightened nut 34. Lower projecting portion 118b, as indicated by broken lines, is received between the longitudinally extending portions of U-shaped member 24, and at least partially received securely under fixed holding flange 26. Accordingly, reel foot 118 is securely received by the mounting body seat that includes fixed holding flange 26 and adjustable holding plate 28. Reel foot 118 is easily removable from such position by loosening nut 34 to the extent necessary. Reel 110 also has a crankshaft 120 upon which a gear 122, having a threaded hole of the appropriate size, is threadedly received after having had a crank handle (not shown) unscrewed therefrom. Gear 122 is thus fixedly but removably mounted to crankshaft 120.

A belt 124 is provided to engage with and extend between gears 82 and 122. Therefore, gears 82 and 122, as respectively and fixedly mounted to drive shaft 80 and crankshaft 120, function in combination with belt 124 to mechanically link drive shaft 80 to crankshaft 120. Idler pulley 90 presses against the outer surface of belt 124 to thereby place the belt under tension.

FIG. 4 further shows fishing line 126 extending forwardly from reel 110, over the front end 38 of elongated portion 12, and then through eyelet 72 at the upper end of extension 68. In response to a predetermined pull upon fishing line 126, lever 70 and its extension 68 pivot to the position indicated by phantom lines, thereby actuating lever actuated switch 66. The pushbutton of pushbutton switch 42 is also shown in phantom lines to indicate its position when pressed to thereby actuate the pushbutton switch. Although not shown, it should be readily apparent that a fisherman can hold rod 108 by grasping rod handle 128 with the fingers of one hand, while pressing the pushbutton of pushbutton switch 42 with the thumb of the same hand.

Figure 5:
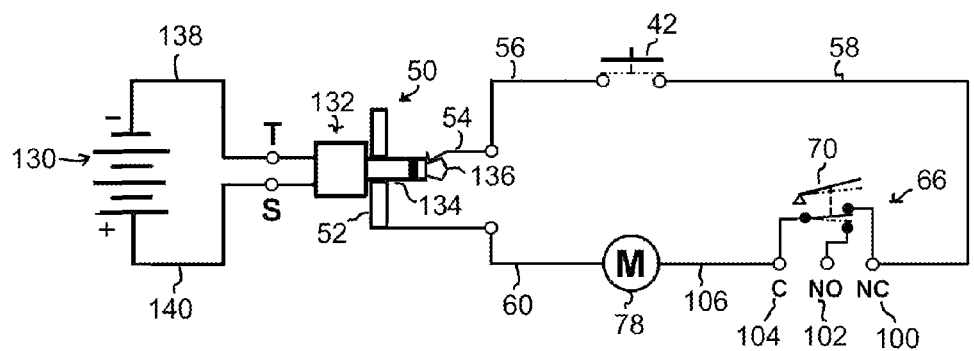
FIG. 5 is a schematic diagram of a circuit as described above, including the motor and switches as well as an external battery connected in series.

Referring now to FIG. 5, the illustrated schematic diagram shows a circuit which includes elements previously described, but in a form that is easier to understand. The circuit includes a phone jack 50 having a sleeve contact 52 and a tip contact 54. Tip contact 54 has a corresponding terminal connected through conducting line 56 to one terminal of pushbutton switch 42. The other terminal of pushbutton switch 42 is connected to terminal 100 of lever actuated switch 66 via conducting line 58. Terminal 100 is marked with the designation "NC", meaning normally closed. Terminal 104 is connected through conducting line 106 to one terminal of electric motor 78. Terminal 104 is marked with the designation "C", meaning common. The other terminal of electric motor 78 is connected through conducting line 60 to that terminal of jack 50 corresponding to sleeve contact 52.

Pushbutton switch 42 is shown in FIG. 5 as being normally open, as indicated by solid lines. Pushbutton switch 42 can be placed in its closed position, as indicated by phantom lines, by pressing the corresponding pushbutton. The open and closed positions of pushbutton switch 42 are similarly and respectively indicated by solid and phantom lines in FIG. 4, as previously discussed. FIG. 5 further shows lever actuated switch 66 as being normally closed, as indicated by solid lines, connecting common terminal 104 to terminal 100. Pivotal movement of lever 70 to the position indicated by phantom lines places the internal switch mechanism in its open position, as also indicated by phantom lines, connecting the common terminal 104 to terminal 102. As shown, terminal 102 is left unconnected to any other element. The positions of the lever 70 corresponding to the closed and open positions of lever actuated switch 66 are also respectively indicated by solid and phantom lines in FIG. 4.

In addition to those elements of the circuit shown in other FIGURES, FIG. 5 further shows additional elements for supplying electrical power to electric motor 78; namely, a battery 130 and a phone plug 132 for insertion into jack 50. Plug 132 includes a sleeve 134 extending into and through sleeve contact 52 so as to make electrical contact therewith. Plug 132 also has a tip 136, insulated from the sleeve, that makes electrical contact with tip contact 54. A terminal designated as "T", and corresponding to tip 136, is connected through conducting line 138 to the negative terminal of battery 130. Another terminal designated as "S", and corresponding to sleeve 134, is connected to the positive terminal of battery 130 via conducting line 140. Battery 130 is preferably very portable so as to be easily taken to any fishing location, and supplies a voltage compatible with electric motor 78. Where the motor is of the type previously mentioned, a small rechargeable lead acid battery having a capacity of only about 1-2 Ah is sufficient, and has the advantage of having a small footprint and being light in weight.

In actual use of the invention, a fisherman may use only one arm and hand to fish with ease, thus allowing a handicapped individual to enjoy a sport that typically requires one hand to hold the rod and the other hand to operate the crank handle of the reel. More specifically, when a fish has bitten and is on the line, the fisherman uses one arm and hand to lift the rod up and back so as to exert an inward pulling force upon the fish. After at least partially pulling in the fish, the rod is lowered so as to relieve most but not all of the tension on the line, while pressing the pushbutton switch with the thumb of one hand and grasping the rod handle with fingers of the same hand. The pushbutton switch in its closed position causes the motor to operate and rewind line onto the reel. This procedure is repeated as many times as necessary until the fish is pulled into the fisherman as positioned on a boat or bank. Even if the fisherman continues to press upon and thus close the pushbutton switch while lifting up and back on the rod, the lever actuated switch will open in response to a predetermined pull upon the line and consequently turn the motor off, thus acting as a safety switch in preventing an undue burden upon and possible destruction of the motor.

The mounting body of the invention is particularly advantageous insofar as being useable with a conventional rod and reel without requiring any structural modifications to the reel. All that is required is to remove the crank handle from the reel, and replace it with a gear.

Obviously, many modifications and variations of the present invention are possible in light of the above teachings. It is, therefore, to be understood that the invention can be practiced otherwise than as specifically described.

That which is claimed is:

1. An apparatus for use with a fishing rod and reel, wherein the reel has a reel foot and crankshaft as well as fishing line extending therefrom, and wherein the rod has a rod seat, said apparatus comprising:
    a mounting body having an elongated portion and a mounting body foot integrally connected thereto and securely but removably receivable by the rod seat, the mounting body also having a mounting body seat incorporated into the elongated portion such that the reel foot is securely but removably receivable therein;
    an electric motor having a drive shaft;
    a motor mounting means for fixedly but removably mounting the motor to the mounting body;
    a linkage means for mechanically linking the drive shaft of the motor to the crankshaft of the reel; and
    a control circuit for controlling operation of the electric motor, including a safety switch fixedly mounted to the elongated portion of the mounting body, wherein the safety switch is normally closed to allow operation of the motor, but opens to prevent its operation in response to a predetermined pull upon the fishing line.

2. An apparatus as recited in claim 1 wherein the elongated portion has upper and lower sides, as so oriented when the apparatus is in use with the fishing rod and reel, the mounting body seat being incorporated into the upper side, and the mounting body foot being integrally connected to and depending from the lower side.

3. An apparatus as recited in claim 2 wherein the elongated portion further has a front end and a back end, and wherein the fishing line extends forwardly from the reel over said front end and the safety switch is fixedly mounted on the upper side of the elongated portion adjacent to its front end, said control circuit further including a battery and a normally open pushbutton switch fixedly mounted on the upper side of said elongated portion adjacent to its back end, the battery, normally open pushbutton switch, and normally closed safety switch being connected in series so as to cause operation of the electric motor upon closure of the pushbutton switch, and termination of such operation in response to said predetermined pull upon the fishing line to thereby open the safety switch.

4. An apparatus as recited in claim 3 wherein the safety switch comprises a lever actuated switch and an extension of its lever having an eyelet for receiving fishing line therethrough.

5. An apparatus as recited in claim 1 wherein the motor mounting means includes an opening in the mounting body for receiving the electric motor therein.

6. An apparatus as recited in claim 1 wherein the linkage means includes a first gear fixedly mounted to the drive shaft, a second gear fixedly but removably mounted to the crankshaft, and a belt engaged with and extending between the first and second gears.

7. An apparatus for use with a fishing rod and reel, wherein the reel has a reel foot and crankshaft, and the rod has a rod seat, said apparatus comprising:
- a mounting body having an elongated portion with upper and lower sides, as so oriented when the apparatus is in use with the fishing rod and reel, the upper side having incorporated therein a mounting body seat in which the reel foot is securely but removably receivable, and wherein the lower side has a mounting body foot integrally connected to and depending therefrom so as to have and downwardly extend to a pair of lower oppositely projecting portions which are securely but removably recrivable by the rod seat;
- an electric motor having a drive shaft;
- a motor mounting means for fixedly but removably mounting the motor to the mounting body; and
- a linkage means for mechanically linking the drive shaft of the motor to the crankshaft of the reel.

8. An apparatus as recited in claim 7 wherein the rod seat includes a pair of receptacles in which the lower oppositely projecting portions of the mounting body foot are securely but removably receivable, respectively.

9. An apparatus for use with a fishing reel having a reel foot and crankshaft as well as fishing line extending therefrom, said apparatus comprising:
- a fishing rod having a rod seat;
- a mounting body having a mounting body foot securely but removably received by the rod seat, and also having a mounting body seat in which the reel foot is securely but removably receivable;
- an electric motor having a drive shaft;
- a motor mounting means for fixedly but removably mounting the motor to the mounting body; and
- a linkage means for mechanically linking the drive shaft of the motor to the crankshaft of the reel.

10. An apparatus as recited in claim 9 wherein the fishing rod has a handle.

* * * * *